(No Model.)
J. B. WEST.
CAR WHEEL.
No. 570,525.  Patented Nov. 3, 1896.
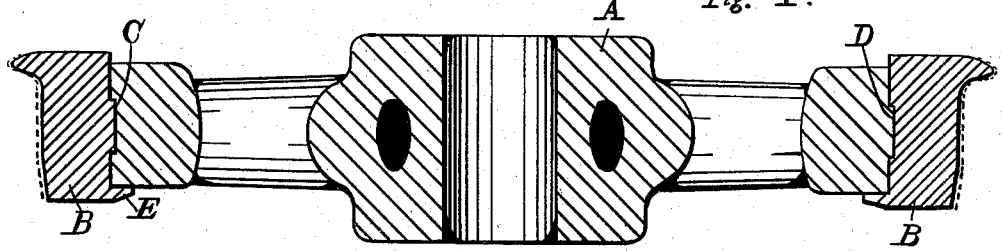
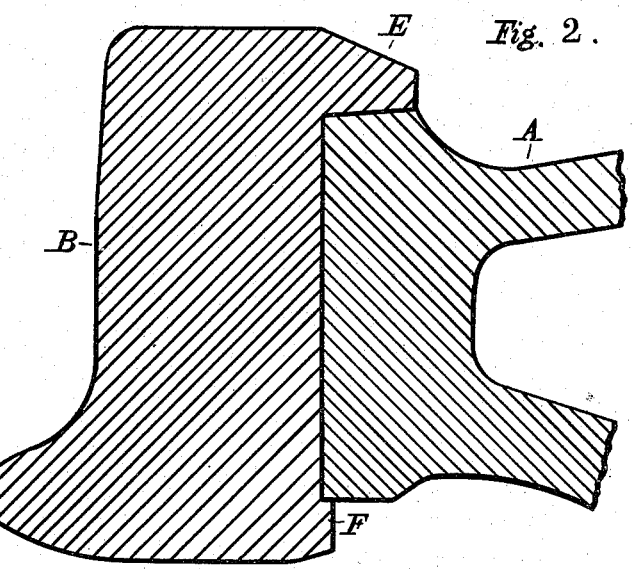
Witnesses:
F. L. Dodgson
H. C. H. Cooper
Inventor:
Jonathan B. West,
By Geo. B. Selden.
atty.

UNITED STATES PATENT OFFICE.

JONATHAN B. WEST, OF ROCHESTER, NEW YORK.

CAR-WHEEL.

SPECIFICATION forming part of Letters Patent No. 570,525, dated November 3, 1896.

Application filed August 31, 1895. Serial No. 561,106. (No model.)

*To all whom it may concern:*

Be it known that I, JONATHAN B. WEST, a citizen of the United States, residing at Rochester, in the county of Monroe and State of New York, have invented an Improved Car-Wheel, of which the following is a specification, reference being had to the accompanying drawings.

My invention relates to an improved car-wheel, in the construction of which the rolled tire is compressed or upset upon the turned center, being thereby trued and secured in place, while the resulting wheel is cheapened and rendered more durable.

My invention is fully described and illustrated in the following specification and the accompanying drawings, the novel features thereof being specified in the claims annexed to the said specification.

My improved car-wheel is represented in the accompanying drawings, in which—

Figure 1 is a transverse section. Fig. 2 is a partial section showing a modification.

I have ascertained by practical trials that rolled tires for car-wheels can be upset or compressed at ordinary temperatures upon the centers by the suitable application of hydraulic pressure, such tires being thereby secured firmly in place, with the result of securing a cheaper and more durable wheel.

In the practice of my invention I take a wheel-center A, Fig. 1, of any ordinary or preferred construction or material, and, the outer surface being trued in a lathe, I apply to it the rolled tire B, which is upset or compressed, so as to shorten its circumference, by pressure applied to the tread by suitable mechanical means—such, for instance, as the hydraulic tire-setter described in my Patent No. 520,817, dated June 5, 1894. The pressure is applied to the exterior surface of the tire by suitably-formed blocks adapted to fit the shape of the tread and flange, which blocks are forced inward by hydraulic pistons or plungers. The blocks are so arranged as to cover the entire surface of the tire at the end of the compressing operation.

In practice I have found that the amount of pressure required to upset an ordinary rolled-steel tire of usual dimensions is upward of three thousand tons.

In order to fasten the tire in place so that it cannot be detached, I turn a projecting rib or flange D, Fig. 1, or a groove C on the center, and in the upsetting the metal of the tire is forced inward on both sides of the rib or into the groove, so that lateral displacement becomes impossible. Instead of a continuous groove or rib recesses or projections may be employed on either the outer surface of the center or the interior of the tire.

In a modification represented in Fig. 2 the tire B is represented as rolled, with the usual internal flange E on the outside of the wheel, and also as having an internal rim or flange F on the inner side, which flange is formed by the compression of the tire forcing the metal over the edge of the center A. The tires are trued up on the center by the compression. The ordinary rolled tire may be placed on the center without turning its inner surface, and the subsequent operation renders the tread true and concentric, the center being bored after the tire has been compressed. The tire may be turned, if desired, but my invention saves the expense of this operation and provides also a better wearing-surface, since the tread remains with the hard skin formed on it in the rolling-mill. My improved wheels are therefore cheaper and more durable than those of any other construction now known to me.

It will be understood that my invention may be applied to securing the tires on locomotive driving-wheels. On tires for thirty-six-inch wheels the amount of compression is sufficient to make the internal flange F three-sixteenths or one-fourth inch thick.

I claim—

1. The herein-described improved railway-wheel, consisting of a metallic center trued on its outer edge, and having a continuous rolled flanged tire provided with an internal flange on the outside of the center and with another internal flange or recess, and attached to the center by compression, substantially as described.

2. The herein-described improved railway-wheel, consisting of a metallic center trued on its outer edge, and having attached thereto by compression a continuous rolled flanged tire provided with an internal flange on the outside of the center and an internal rib on the inside of the wheel formed by the compression of the tire, substantially as described.

JONATHAN B. WEST.

Witnesses:
GEO. B. SELDEN,
H. C. H. COOPER.